(12) United States Patent
Jones et al.

(10) Patent No.: US 10,707,723 B2
(45) Date of Patent: Jul. 7, 2020

(54) VACUUM MANAGEMENT SYSTEM (71) Applicant: Punch Flybrid Limited, Northampton (GB)

(72) Inventors: Daniel R. Jones, Buckinghamshire (GB); Andrew Early, Oxfordshire (GB)

(73) Assignee: Punch Flybrid Limited, Northampton (GB)

( * ) Notice: Subject to any disclaimer, the term of this patent is extended or adjusted under 35 U.S.C. 154(b) by 0 days.

(21) Appl. No.: 15/876,366

(22) Filed: Jan. 22, 2018

(65) Prior Publication Data
US 2018/0142763 A1 May 24, 2018

Related U.S. Application Data (63) Continuation of application No. 15/054,806, filed on Feb. 26, 2016, now abandoned.

(30) Foreign Application Priority Data

Feb. 27, 2015 (GB) .................................. 1503396.2

(51) Int. Cl.
F16F 15/30 (2006.01)
G05D 16/20 (2006.01)
H02K 7/02 (2006.01)

(52) U.S. Cl.
CPC ............. *H02K 7/025* (2013.01); *F16F 15/30* (2013.01); *G05D 16/202* (2013.01)

(58) Field of Classification Search
CPC ...... F16F 15/30; F16F 15/302; F16F 15/3156; G05D 16/20; G05D 16/2066; H02K 7/02; B60K 6/10; B60K 6/105; Y02E 60/16; Y02T 10/6204
See application file for complete search history.

(56) References Cited

U.S. PATENT DOCUMENTS

| | | | | |
|---|---|---|---|---|
| 4,177,833 A | * | 12/1979 | Morrison | F16K 3/0227 137/625.12 |
| 4,996,016 A | * | 2/1991 | Walls | B29D 99/0046 264/229 |
| 5,398,571 A | * | 3/1995 | Lewis | F16C 32/0459 310/90.5 |
| 6,585,490 B1 | * | 7/2003 | Gabrys | H02K 7/025 310/74 |
| 6,710,489 B1 | * | 3/2004 | Gabrys | H02K 7/025 310/74 |
| 7,053,589 B2 | * | 5/2006 | Gabrys | H02K 7/025 310/74 |
| 9,099,946 B2 | * | 8/2015 | Schroeder | H02P 3/04 |

(Continued)

FOREIGN PATENT DOCUMENTS

| | | | |
|---|---|---|---|
| DE | 19620368 C1 | * 5/1997 | .............. F16F 15/30 |
| EP | 0198936 A1 | * 10/1986 | .......... F04C 18/3441 |

(Continued)

*Primary Examiner* — Adam D Rogers
(74) *Attorney, Agent, or Firm* — McCracken & Gillen LLC (57) ABSTRACT

The invention provides a flywheel system comprising a flywheel mounted for rotation within a chamber, a vacuum pump system and a valve for selectively closing a passage, wherein the chamber is coupled to an inlet of the vacuum pump system via the passage. The invention also provides a method of controlling the starting and stopping of the flywheel system.

20 Claims, 2 Drawing Sheets

(56) References Cited

U.S. PATENT DOCUMENTS

| | | | |
|---|---|---|---|
| 9,279,474 B2* | 3/2016 | Tarrant | F16F 15/3156 |
| 9,303,721 B2* | 4/2016 | Early | F16F 15/3156 |
| 9,325,217 B2* | 4/2016 | Veltri | F16C 32/0417 |
| 9,350,213 B2* | 5/2016 | De Vries | F03G 3/08 |
| 9,843,237 B2* | 12/2017 | Kalev | H02K 7/025 |
| 2014/0124172 A1* | 5/2014 | Veltri | F16F 15/302 |
| | | | 165/104.19 |
| 2014/0125171 A1* | 5/2014 | Bremer | H02K 7/025 |
| | | | 310/74 |

FOREIGN PATENT DOCUMENTS

| | | | |
|---|---|---|---|
| EP | 3056736 A1 * | 8/2016 | F04C 23/001 |
| JP | 63046523 A * | 2/1988 | |

\* cited by examiner

VACUUM MANAGEMENT SYSTEM

CROSS-REFERENCE TO RELATED APPLICATION

This application claims priority to GB 1503396.2 filed Feb. 27, 2015 which is hereby incorporated by reference in its entirety.

FIELD OF INVENTION

The invention relates to flywheel systems and in particular to a vacuum management system for such flywheel systems.

BACKGROUND OF THE INVENTION

Flywheels typically comprise a relatively heavy mass, mounted on a shaft and arranged to rotate with the shaft. The use of flywheels in vehicles is known, for example in kinetic energy recovery systems for recovering kinetic energy from the movement of part or all of a vehicle and for subsequently returning that energy to the vehicle. Such systems are used in other applications, for example where energy is recovered from the boom of a working vehicle such as a loader. The kinetic or potential energy recovery is converted to kinetic energy of a flywheel.

The kinetic energy of a flywheel is directly proportional to the rotational inertia and the square of the angular velocity. A flywheel used for energy storage in a vehicle should achieve an optimum balance of mass, inertia and rotational speed. Consequently the faster the flywheel can be made to rotate, the smaller and lighter it will be for a given energy storage capacity.

High speed flywheels typically operate with maximum rotational speeds which are at least 15000 rpm. Such flywheels are usually contained within an enclosure which is at least partially evacuated, in order to reduce windage losses, i.e. energy losses caused by drag due to the movement of the flywheel through any fluid, e.g. air, in the enclosure. This helps to reduce the power consumption of the flywheel system, increasing the energy recoverable from the flywheel and also preventing the temperature of the flywheel from rising too high. This is particularly important where the flywheel is constructed from composite materials that include a resin, which are typically sensitive to high temperatures.

When a flywheel is contained within an evacuated enclosure, it is necessary to provide a seal between the housing and the shaft on which the flywheel is mounted, in order to allow the vacuum within the enclosure to be maintained. However, even with an effective seal, it is often necessary to "top-up" the vacuum by pumping any air or vaporised fluid (such as oil) that has leaked into the enclosure back out again, to maintain the very low pressure within the enclosure.

Creating the required vacuum level inside the enclosure can be challenging, particularly when creating it in the environment of a vehicle. Efficient vacuum pumps often require precision parts to achieve the desired vacuum pressures for flywheel operation. For example, a vacuum management system for a flywheel arrangement may include a precision pump in order to achieve the desired vacuum levels typically less than 4 mbar.

However the costs of such precision pumps tends to restrict their application to non-vehicle applications and makes vehicle-type applications undesirably expensive. Furthermore, in high mileage commercial vehicles and other challenging conditions, such as construction vehicles, trucks, distribution vehicles, buses and so on, durability and reliability are important factors. This further complicates the specifications of vacuum pumps for these applications.

Achieving the desirable vacuum levels within a short timeframe following start-up of the flywheel is also challenging because the ability to reduce pressure in the chamber becomes increasingly difficult as the chamber pressure approaches a true vacuum. Thus the pressure tends to fall asymptotically, approaching the final achievable near-vacuum pressure over a period of time. In other words, reducing the chamber pressure towards zero absolute pressure takes a considerable period of time.

This delay in achieving the desirable vacuum level means there is a period of time where the flywheel is not spun up or during which the rotation of the flywheel is allowed but results in undesirable windage losses. Alternatively, to mitigate this, the designer may install a high specification vacuum pump system. This will carry a penalty of reduced performance, or increased cost, respectively.

Storage and re-use of energy using flywheel storage systems may be used to reduce energy consumption or exhaust emissions of machines or vehicles. Enabling the flywheel system to operate optimally with low windage losses for the maximum time possible would enable the energy efficiency benefits of using the flywheel system to be maximised, because the flywheel chamber would be at a lower pressure for more of the time and so able to operate at its most efficient.

There is therefore a need for a flywheel system which is able to achieve and maintain optimally low flywheel chamber pressures for increased portions of the flywheel apparatus' operating time, without the undesirable need to use higher efficiency pumps which would add to the cost which would be prohibitive for vehicle-type applications. The present invention aims to provide a solution which achieves at least some of these aims.

SUMMARY OF THE INVENTION

Therefore in accordance with the present invention there is provided a flywheel system comprising: a flywheel; a chamber within which said flywheel is provided; a passage for connecting the chamber to an inlet of a vacuum pump; and a valve arranged to selectively open or close said passage.

The invention provides an arrangement which can retain a high level of vacuum when the vacuum pump system is not in operation, so that the flywheel achieves a low loss running condition in a short space of time after restarting. Furthermore, the invention can be implemented in an arrangement which comprises easily manufactured valve components and may incorporate a conventional vacuum pump, and so may be a cost effective solution.

The vacuum pump may be used as part of the flywheel system. Such a flywheel system would allow the chamber to be coupled to the inlet to the pump for evacuating the chamber. Preferably, the operation of the valve is determined at least partially based upon a chamber pressure value corresponding to the pressure in the chamber. The chamber pressure value may not be an exact reflection of the chamber pressure but may be estimate based on some measurement of the pressure or indirectly by reference to some other parameter of the system, e.g. resistance imposed on the flywheel due to rotating in the chamber. An estimate of the pressure provides a sufficiently accurate indication to provide adequate control of the system. This avoids the need for accurate and potentially intrusive pressure measuring devices.

The valve may be arranged to open the passage when the chamber pressure value exceeds a first value. The inlet pressure value may not be an exact reflection of the inlet pressure but may be estimate based on some measurement of the pressure or indirectly by reference to some other parameter of the system, e.g. speed of the vacuum pump. In this way, the valve only opens when the pressure in the chamber is above a certain value and thus needs reducing.

The valve may further be arranged to open the passage when said chamber pressure value exceeds the inlet pressure value corresponding to the pressure at the inlet of the vacuum pump. By ensuring that the pressure at the pump is lower than the chamber pressure, it can be ensured that the tendency will be for air to move out of the chamber.

The first value is preferably between 4 and 8 mbar. In this way the chamber is preferably maintained at a pressure less than the first value. The pump may then draw the chamber pressure down such that it lies in the most preferable range of 4 mbar or less. Similarly, the valve may be closed when the chamber pressure value falls below a second value. The second value may be 4 mbar or less. The valve may be opened at a higher chamber pressure than the chamber pressure at which the valve is closed, i.e. the second value may be less than the first value, thus creating a control cycle which suitably incorporates a control deadband. Where the valve is of the normally closed type, closing the valve once the chamber has reached its optimum pressure saves energy because the valve need not be powered.

A pressure sensor may be used for determining the chamber pressure value. In order to obtain a pressure value, a pressure sensor may be used to directly measure the pressure in the chamber. Similarly, a pressure sensor may be used for directly determining the pump inlet pressure value. This can provide an accurate measure of pressure but, as noted above, would typically require a physical connection to the chamber, e.g. by a channel or other means.

The valve preferably includes a sealing means for sealing the flow path through the passage. In this way, when the valve is closed, a good seal is provided to prevent ingress of air into the chamber causing the vacuum to be lost. This is particularly important for maintaining the low pressure when the system is not operational or in stand-by where no operational pump may be available to maintain the pressure.

The sealing means may include a face seal. The face seal may comprise a resiliently deformable means that bears against a sealing face. The resiliently deformable means may be formed from an elastomer.

The valve is preferably arranged such that the pressure at the inlet of the vacuum pump acts on the valve to urge the valve to close, and the pressure in the chamber acts on the valve to urge the valve to open. This differential pressure can be used to provide a net pressure on the valve to prevent the valve opening. For example, if the pressure at the inlet is higher than the chamber and the valve were to be opened, the pressure in the chamber would tend to rise. Whilst this is not desirable operation, it is possible that, for example, a fault or error in measuring the pressures may inadvertently cause this. However, by allowing the valve to be held closed by a pressure differential between the chamber and the pump inlet, the valve could be prevented from opening if a significant pressure differential existed. For example, the valve may be arranged so that a pressure difference of 50 mbar would prevent the valve from opening. In this way, if the pump inlet pressure was more than 50 mbar higher than the chamber, the valve would be prevented from opening, thus preventing rapid heat build-up in and potential damage to the flywheel. The pressure difference may be selected according to the specific implementation and other values may be appropriate.

The valve may include a biasing means acting to urge the valve to close. The biasing means is preferably a spring. The preload and stiffness of the biasing means may be used to control the force needed to open the valve. The force needed to open the valve may also be dependent upon the pressure difference between the pump inlet and the chamber, as described above. The force would typically be supplied by a solenoid.

The flywheel system of the invention may further comprise a valve energising means wherein the passage is opened when the valve is in an energised state. This arrangement means that the valve would normally be closed providing a failsafe closed position to preserve any vacuum in the chamber, for example should the valve control fail. Further, the valve may be de-energised when the chamber is operating at its preferred pressure, thus lowering power consumption by the valve.

Preferably, the valve is a solenoid valve. This allows a control system to easily control opening of the valve.

The flywheel and the vacuum pump may be mechanically coupled. This coupling allows the pump to be driven by the flywheel, ensuring that when the flywheel is operating and so when a vacuum is important, the pump is also running. This provides a degree of certainty that a vacuum can be produced and maintained if the flywheel is operating, in contrast to a separate drive arrangement for the pump.

The vacuum pump may be driven by a pump drive means. The pump drive means may be selected from one of: a motor; a connection to a vehicle driveline; and a transmission coupleable to said flywheel. The use of a separate drive means that the vacuum can be generated independently of the flywheel operating. This allows a vacuum to be generated and maintained whilst the flywheel is stationary ensuring that the chamber pressure is as close to optimal before the flywheel begins to rotate.

The present invention further provides a method of controlling the starting of a flywheel system comprising a flywheel; a chamber within which said flywheel is provided; a passage for connecting the chamber to an inlet of a vacuum pump mechanically coupled to said flywheel; and a valve arranged to selectively open or close said passage, said method comprising: maintaining the valve in a closed state until the flywheel is rotating; and opening the valve after the flywheel begins rotating.

This arrangement allows the flywheel to start to rotate and by virtue of their coupling, the vacuum pump before the valve is opened. Ideally, the pressure in the chamber will be low enough from previous operation to allow the flywheel to be safely operated. Once the flywheel starts to rotate, the vacuum pump will reduce the pressure at its inlet until it is sufficiently low to aid in reducing the pressure. Then the valve can be opened without compromising the chamber pressure.

The method may further comprise opening the valve when the pump is rotating at a speed in excess of a third value. The third value can be selected to reflect a pressure at the inlet to the vacuum pump which would ensure an adequate pressure for the flywheel chamber. The third value is preferably 1000 rpm.

The method preferably further comprises determining an inlet pressure value corresponding to the pressure at the inlet of the vacuum pump. The inlet pressure value may be determined from the speed of the pump, from the time at which the pump has been running at a certain speed, or from a combination of the two. Typically if the pump has been operating at a speed of at least 1000 rpm for a period of at least 2 to 3 seconds, then the pressure at the pump inlet is deemed to be less than 4 mbar, and therefore the valve may be opened. Using this value, an appropriate point in time can be determined for opening the valve.

The method optionally further includes opening the valve when said inlet pressure value is below a fourth value. The fourth value may be 4 mbar or less and more preferably 4 mbar.

The valve may be opened when the inlet pressure value is below a chamber pressure value corresponding to the pressure in the chamber.

Optionally, the method may further comprise opening the valve when the inlet pressure value is below a chamber pressure value corresponding to the pressure in the chamber The present invention also provides a method of controlling the shutting down of a flywheel system comprising: a flywheel; a chamber within which said flywheel is provided; a passage for connecting the chamber to an inlet of a vacuum pump mechanically coupled to the flywheel; and a valve arranged to selectively open or close said passage, the method comprising: determining when the rotating flywheel is to be shut down; and closing the valve before controlling said flywheel to come to rest.

Controlling the flywheel to come to rest may include applying a level of torque, either positive, negative or zero, to the flywheel, such that is slows down. The torque level may be applied by a flywheel transmission that is coupleable to the flywheel. Zero torque may be applied, for example, by clutching the flywheel from the flywheel transmission.

The present invention also provides a method of controlling the starting of a flywheel system comprising: a flywheel; a chamber within which said flywheel is provided; a passage for connecting the chamber to an inlet of a vacuum pump driven by a pump drive means, and a valve arranged to selectively open or close said passage, wherein said pump drive means is selected from one of: a motor, a connection to a vehicle driveline, and a transmission coupleable to said flywheel, said method comprising: limiting rotation of the flywheel to a maximum allowable speed; driving the vacuum pump system with said pump drive means; opening said valve; and increasing said maximum allowable speed of rotation of the flywheel.

Limiting the maximum allowable speed of the flywheel may include limiting the speed such that it is substantially not rotating.

The method may further comprise opening the valve when the pump is rotating at a speed in excess of a fifth value. The sixth value can be selected to reflect a pressure at the inlet to the vacuum pump which would ensure an adequate pressure for the flywheel chamber. The fifth value is preferably 1000 rpm.

The method of controlling the starting of the flywheel system may further comprise determining an inlet pressure value corresponding to the pressure at the inlet of the vacuum pump. The inlet pressure value may be determined from the speed of the pump, from the time at which the pump has been running at a certain speed, or from a combination of the two. Typically if the pump has been operating at a speed of at least 1000 rpm for a period of at least 2 to 3 seconds, then the pressure at the pump inlet can be deemed to be less than 4 mbar, and therefore the valve may be opened. Using this value, an appropriate point in time can be determined for opening the valve.

The method may include controlling the valve to open when said inlet pressure value is below a sixth value. The sixth value may be 4 mbar or less and more preferably 4 mbar.

The method may further include controlling the valve to open when the inlet pressure value is below a chamber pressure value corresponding to the pressure in the chamber.

The present invention also provides a method of controlling the shutting down of a flywheel system comprising a flywheel; a chamber within which said flywheel is provided; a passage for connecting the chamber to an inlet of a vacuum pump driven by a pump drive means, and a valve arranged to selectively open or close said passage, wherein said pump drive means is selected from one of: a motor, a connection to a vehicle axle, and a transmission coupleable to said flywheel, said method comprising: determining when the rotating flywheel is to be shut down; closing the valve; and controlling said vacuum pump to come to rest.

Once it is determined to shut down the flywheel, the valve can be closed, ideally leaving the chamber at the lowest possible pressure ready for when the flywheel is restarted. Once the valve is closed, the vacuum pump can be shut down, which can help to reduce power consumption.

The above method may further comprise controlling the flywheel to come to rest. Optionally, this may be made to happen before closing the valve. In this way, only once the flywheel has stopped, is the pump separated from the chamber, which will help to maintain the pressure in the chamber whilst the flywheel is turning.

The present invention also provides a method of controlling a flywheel system comprising: a flywheel; a chamber within which said flywheel is provided; a passage for connecting the chamber to an inlet of a vacuum pump mechanically coupled to said flywheel; and a valve arranged to selectively open or close said passage, the method comprising monitoring a value of one of more parameters of said flywheel system, each parameter having an associated range above or below a respective threshold, wherein said method comprises selectively opening or closing said valve when the value of at least one of said parameters is within said associated range.

One of the parameters may be the pump speed, wherein the valve is opened when the pump speed exceeds a seventh value. The seventh value is preferably 1000 rpm. In this way, it is known that the pump will have been operating for the duration of the start-up (preferably at least 2 to 3 seconds) and will be pumping at an adequate rate to provide a pressure low enough at its inlet to connect to the chamber without compromising the pressure in the chamber and the reliable and efficient operation of the flywheel.

One of the parameters may be the pressure at the inlet of the vacuum pump, and wherein the valve is opened when an inlet pressure value corresponding to the pressure at the inlet of the vacuum pump is below a eighth value. By monitoring the pressure at the inlet directly, the method can ensure that the pressure is low enough to ensure reliable flywheel operation.

The eighth value may be a fixed value of 4 mbar. The eighth value may be set to be a chamber pressure value corresponding to the pressure in the chamber.

Alternatively, the eighth value may be set to be a chamber pressure value corresponding to the pressure in the chamber, less a ninth value. The ninth value is preferably less than 4 mbar.

One of the parameters may be the pressure in the chamber, wherein method comprises opening the valve when a chamber pressure value corresponding to the pressure in the chamber is above a tenth value. The tenth value is preferably between 4 and 8 mbar. Once the chamber has achieved the most preferable pressure level, e.g. less than 4 mbar, the valve may once again be closed. The valve may therefore be closed when the chamber pressure value corresponding to the pressure in the chamber falls below an eleventh value. The eleventh value is preferably 4 mbar or less.

The present invention also provides a method of controlling a flywheel system comprising a flywheel; a chamber within which said flywheel is provided; a passage for connecting the chamber to an inlet of a vacuum pump, and a valve arranged to selectively open or close said passage, said method comprising: determining a chamber pressure value corresponding to the pressure in the chamber; determining a maximum flywheel speed value based on the determined chamber pressure value; and limiting the speed of the flywheel based on the determined maximum allowable flywheel speed value.

The vacuum pump may be driven by a pump drive means which may be selected from one of: a motor, a connection to a vehicle axle, the flywheel, and a transmission coupleable to said flywheel.

The determined maximum flywheel speed value of the flywheel may decrease with increasing pressure in the chamber. This can allow a progressive increase in allowable speed as the chamber pressure drops towards its optimum.

The determined maximum flywheel speed value is preferably set to 10,000 rpm or less when the chamber pressure value is above 10 mbar. Other combinations of pressures and speeds may be additionally determined based on the parameters of the system such as the heat generated by the flywheel at a given speed and the heat capacity and heat conductivity of the flywheel and chamber and so on. In this way, the temperature of the flywheel can be prevented from exceeding undesirable levels for the flywheel material. This is particularly important for flywheels that are made of materials that are more sensitive to heat, for example composite materials. Flywheels may be made from a number of materials and different parts may be made from different materials. The rim of the flywheel is moving at the fastest rate and so is likely to get hotter than other parts and so controlling the temperature for the material of this part is particularly important.

The above method may be used during any phase of operation, including normal operation as well as during start-up.

The above methods may be used in conjunction with each other and are not intended to be mutually exclusive.

The present invention also provides a controller for controlling the operation of a flywheel system to carry out the steps of the methods described above.

The flywheel system is preferably mounted on a shaft with seals provided around the shaft between the chamber housing and the shaft, to resist airflow into the chamber. Flywheels operate more efficiently in a vacuum and so sealing the chamber and evacuating it is important. It is therefore also important to maintain the lowered pressure in the chamber by providing good sealing where there is the greatest likelihood of gaps through which air can enter the chamber, particularly in the vicinity of the seals. The seals help to isolate the evacuated portion of the chamber from the bearings and minimise any air ingress.

The seals preferably include a pair of lip seals that contact and encircle the shaft, the space between the seals defining a cavity into which fluid can be provided, for example, by a lubrication pump. By providing a pair of lip seals separated along the shaft, a space can be defined which can be filled with oil. The oil helps to create a hermetic seal between the seal and the shaft, thus preventing any air transiting through the cavity and into the chamber. Any oil that leaks into the chamber may also be extracted by the vacuum pump.

The cavity preferably includes an inlet and an outlet, and a lubrication pump can be used to provide fluid to the inlet to maintain a supply of oil, to replace oil which leaves the cavity either via the lips or from the outlet. This ensures the cavity is permanently full of oil. A pair of lips seals is preferably provided at each side of the flywheel.

The shaft may be mounted on one or more bearings and the or a lubrication pump can provide fluid to the bearings to keep them lubricated.

The valve may be provided between the inlet to the vacuum pump and the chamber. The valve can be used to control flow of air or other fluid between the chamber and the pump.

This is particularly useful during start up and shut down when the pump may not have achieved an operating pressure. As such by closing the valve, the pressure in the chamber can be preserved until the pump achieves a working vacuum pressure or after it has shut down and is unable to maintain a vacuum pressure. In other words, the valve can be used to prevent air flowing back into the chamber from the pump assembly.

The valve may also be used during normal operation of the flywheel system (that is, when the flywheel system is not being started up or shut down).

As noted above, the valve is preferably controlled by a solenoid. This allows the valve to be controlled to open and close at the appropriate time. However, the valve may be mechanically operated such as based on the pressure in the pump or the chamber.

BRIEF DESCRIPTION OF THE DRAWINGS

A specific embodiment of the present invention will now be described in more detail with reference to the drawings in which.

DETAILED DESCRIPTION

Figure 1:
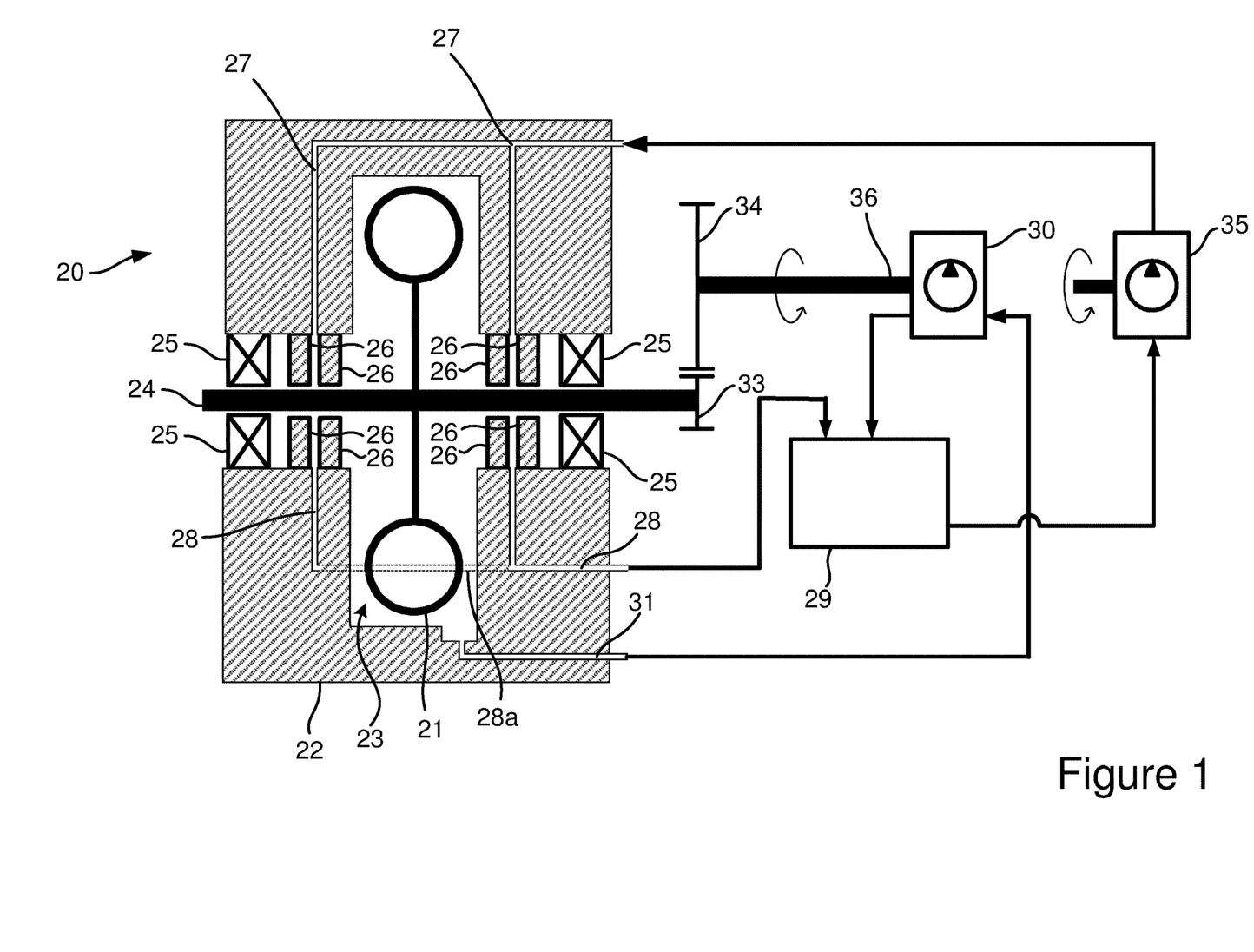
FIG. 1 shows a schematic layout of a flywheel system.

FIG. 1 shows a schematic view of a flywheel system 20. Flywheel 21 is provided within a housing 22. The housing defines a chamber 23 within which the flywheel can rotate in use. The flywheel is mounted on a shaft 24 which is supported on bearings 25. The flywheel may rotate at speeds in excess of 15,000 rpm which results in very high speeds on the surface of the flywheel relative to the air in which the flywheel is rotating. In use, the chamber is maintained at a low pressure to reduce windage loss through rotation of the flywheel.

In order to enclose the chamber 23, lip seals 26 are provided around the shaft 24. It is undesirable for the lip seals to maintain a contact with the shaft and so the space between the seal lips and the shaft is filled with an oil. The oil is provided to the space between the pairs of lip seals 26 through a channel 27 from a lubricating oil pump 35. Oil is provided through the channels 27 to the space between the lip seals so that it can fill the gap between the lip seals and the shaft and prevent air passing into the chamber 23. The oil provides a hermetic seal, reduces losses due to friction and reduces wear of the seals.

The oil is preferably chosen so that it does not vaporize at the reduced pressures in the chamber. This is to ensure that the oil does not vaporize causing the vacuum to become compromised, particularly when the (vacuum) pump is not operating such as during periods when the flywheel is not in use, but where it is still desirable to maintain the vacuum, for example, to minimise start up time.

Closing the valve in order to maintain a low pressure in the chamber is especially effective once the system has been initially run, for example after commissioning of the system or immediately following maintenance work, since any gases will have already been drawn out of grease or the casings and pumped out of the chamber. Thus the chamber vacuum can be maintained for long periods without the pump operating and with the valve closed.

The lubrication pump 35 continuously pumps oil into the space between the lip seals 26. The oil then passes out again through passages 28, 28a. The passages 28 return the oil to an oil reservoir 29. It should be noted that the section of one of the passages 28, labelled 28a, shown in dotted line simply represents the hidden path of the channel 28 and does not pass through the chamber 23.

In order to provide and maintain the low pressure partial vacuum in the chamber 23, a pump 30 is provided. The pump 30 draws any air within the chamber 23 out through channel 31.

It will be appreciated that oil present in the space between the lip seals 26 and the shaft 24 will potentially permeate along the shaft and be deposited within the chamber 23. Having entered the chamber, the oil will tend to sink to the bottom of the chamber 23. The entrance to the channel 31 is therefore provided at the bottom of the chamber 23 so that any oil which enters the chamber collects at the bottom and can be withdrawn by the pump 30 from the chamber 23. Any oil extracted in this way will be passed through pump 30 and deposited into the oil reservoir 29 to be recovered.

The pump 30 is typically positioned beneath the chamber 23 (although this is not shown in the drawings) so that oil is encouraged to flow to the inlet of the pump 30. The reservoir 29 is typically positioned (again not shown in the drawings) above the inlet to lubrication pump 35, to assist with priming of the pump, and to potentially allow a lower cost lubrication pump (such as a gerotor or impeller) to be used.

In this way, the vacuum pump 30 provides the dual function of maintaining low pressure within the chamber 23 but also removing any excess oil which collects in the chamber 23. It will be appreciated that pump 30 is provided to achieve low pressure within the chamber 23. The pressure to be achieved and maintained in the chamber 23 is preferably below 10 mbar, and more preferably below 4 mbar.

The vacuum pump serves to scavenge fluid (lubrication oil) from the bottom of the flywheel chamber and return it to a fluid reservoir 29. As a result the air pumped through the pump 30 may include both air and oil. Air entrained in the fluid is allowed to escape prior to the lubrication oil being pumped by the separate lubrication pump 35 to the sealing cavity between the lip seals and/or the flywheel bearings. In this embodiment, the separation occurs in the reservoir 29 although other means may be used to separate the air from the fluid. As shown in the arrangement of FIG. 1, the air/oil mixture is fed into the top of the reservoir. This can help with the separation so that oil passes into the body of oil in the reservoir but the oil is not aerated by any air in the mixture. The air can then be collected in an air space above the oil and the reservoir 29 provided with a breather to release it.

As shown in FIG. 1, the vacuum pump 30 is driven directly from the flywheel using suitable gearing 33, 34 connected to the shaft 24. Alternatively, the driveshaft 36 may be driven directly by an electric motor or other means such as off some other component on the vehicle on which the flywheel is mounted. In particular, the driveshaft may be driven from a vehicle driveline such as a final drive arrangement, a transmission output or a transmission input, e.g. from the main engine, a vehicle axle or propshaft. The pump may also be driven from a flywheel drive transmission that controls the power flow between the flywheel and, for example, the vehicle. This can be advantageous as the pump can be operated irrespective of the rotation speed of the flywheel. For example, the vacuum pump may be operated before the flywheel system is started up. The flywheel transmission may also be decoupleable from the vehicle driveline.

Figure 2:
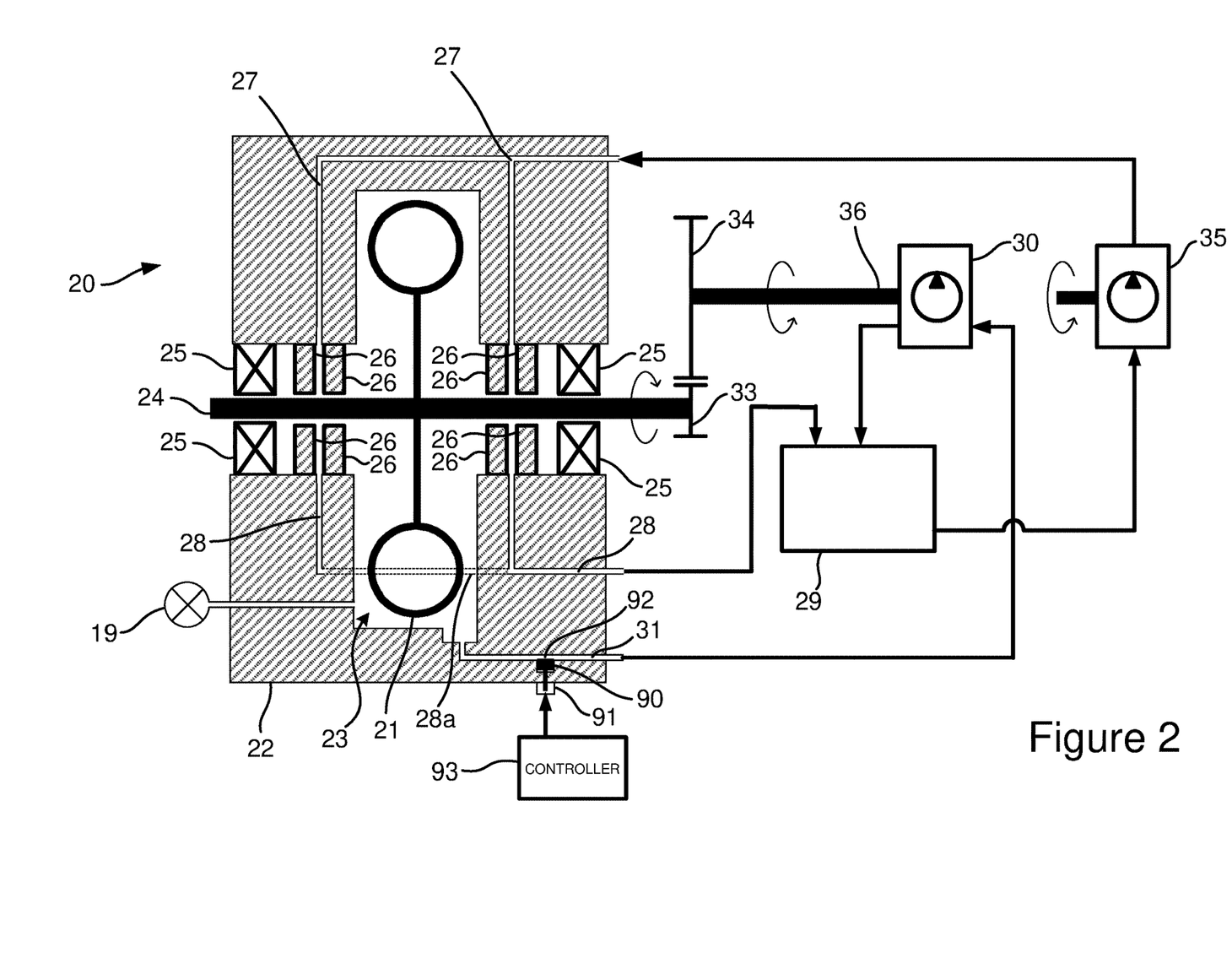
FIG. 2 shows a schematic layout of a flywheel system with a valve.

FIG. 2 shows a modified flywheel arrangement, similar to the arrangement of FIG. 1 but with an additional valve and pressure sensor. The embodiment of FIG. 2 includes the valve 90 on the outlet from the flywheel chamber 23. The valve is engaged by a solenoid 91 to close off the exit from the vacuum chamber or disengaged to leave the channel 31 open. In this way, if the pump 30 is not operating and the pressure at the pump inlet starts to rise, the vacuum state within the flywheel chamber can be better maintained by engaging the valve 90 and isolating the chamber 23 from the pump 30.

The vacuum valve 90 is shown schematically in FIG. 2 but may take a number of forms. For example, the valve may include a face seal 92. This may include a rigid face that compresses a flexible seal such as an elastomeric seal like an o-ring in order to provide a reliable seal to maintain the desirable vacuum, i.e. preferably below 4 mbar. A 'normally closed' vacuum valve—that is one that closes when it receives no energization (for example, electrical energization of a solenoid)—is preferred as the valve will retain the flywheel chamber vacuum in the event of loss of power to the valve. The pump preferably includes a spring that biases it to close when it is not energised or actuated.

In the embodiment of FIG. 2, the valve is controlled by a solenoid 91 and a controller 93. However, it will be appreciated that the valve may be operated using different means. For example, the valve may be mechanically operated, for example by a coupling to a speed related element or a pressure sensitive element. In the latter case, the valve may simply be biased into the closed position and the pressure difference between the chamber and the pump inlet, acting on the valve, opens the valve if the pressure in the pump inlet is lower than the chamber.

In another variation, the valve includes both an actuator (for example, a solenoid), and also a spool or plunger upon which two pressures act. Each pressure may bear on a different sized area of the spool. This may be achieved with a cylindrical spool that seals against a conical face. The non-sealing end of the spool is arranged to be exposed to a larger area than the sealing end of the spool. The vacuum pump inlet pressure may bear against the larger area of the spool, whilst the flywheel chamber pressure may bear against the smaller area of the spool. Alternatively the chamber pressure may not bear against the spool at all. With this arrangement, when the pump inlet pressure is at a pre-determined value or at a pre-determined level higher than the chamber pressure, the actuator and optional bias spring are arranged such that the available actuation force is insufficient to open the valve. This prevents the vacuum valve from being opened by the actuator when the pump inlet pressure is inappropriately high, such as when the pump system is not operating or when it has developed a fault. Preventing the solenoid from opening the valve when the pump inlet pressure is relatively high can prevent damage to the flywheel due to excessive windage losses and heating.

Whilst the flywheel is in normal operation (that is, not during its start-up or shut-down phase), the valve may be closed if it is determined that the pressure in the chamber is below a level suitable for optimum operation. The optimum pressure range for the flywheel is below 4 mbar, and preferably the flywheel operates with a chamber pressure at this level. By de-energising the valve under normal operation, the mean power required by the valve is reduced, thus improving efficiency of the flywheel system.

As shown in FIG. 2, a pressure sensor 19 is provided for measuring and determining the pressure in the chamber. However, it will be appreciated that the pressure may be determined in other ways, for example by reference to other parameters of the system or using other pressure sensors. The pressure may not be determined precisely and instead an estimate of the pressure may be all that is determined and used to determine the control of the system. For example, such an estimate may be made by monitoring the drive effort imparted to the flywheel by a flywheel drive system, determining the flywheel's speed and/or acceleration, and inferring the pressure in the chamber.

The sequence of operation of a vacuum pump in a flywheel application is important. When the flywheel is initially operated, it can take a considerable time to generate the desired vacuum level within the flywheel chamber. Whilst the pressure in the chamber is higher than the optimum, the air causes increased flywheel losses. Consequently, between the time when the flywheel begins to rotate and the time at which the desired vacuum level is achieved by operation of the pump, increased losses waste energy causing heating of the flywheel and reduce the efficiency of the flywheel. It is therefore desirable to maintain the vacuum level in the flywheel chamber during periods of 'off-time' rather than allowing the chamber to rise to atmospheric pressure and then have to be reduced again when operation recommences.

In the arrangement of FIG. 2, the vacuum pump 30 is driven by the driveshaft 36 coupled to the flywheel and so any pumping action is dependent on the flywheel operating. In the initial start-up period, the flywheel will start to spin but the pump 30 will not have operated for a sufficient period of time to reduce the pressure in the flywheel chamber to the desired operating pressure. There will therefore be a period when the flywheel is already rotating before the pressure in the chamber is reduced below a pressure where increased losses occur, especially if the flywheel is run up to close to its maximum operating speed.

This arrangement of coupling the pump 30 to the flywheel does have the advantage of good reliability because there is no motor to potentially fail. There is also no need for motor drive electronics. The flywheel may also be used to drive the lubrication pump 35. This means that there is the assurance that lubrication will be available whenever the flywheel is rotating, which coincides with the time when the need for lubrication is most important.

To accommodate 'start-up' of the flywheel system, the valve 90 is initially closed, preventing airflow through it (and preserving any reduced pressure level within the chamber). The flywheel is then caused to rotate. As the flywheel starts rotating, the drive shaft 24 will begin to turn. This will cause the shaft 36 to turn and the pump 30 will start to operate, lowering the pressure in the channel 31 between the pump 30 and the valve 90. Once the pressure is low enough, the valve can be opened allowing the pump to withdraw air from the flywheel chamber 23 and reduce the pressure within it to the desired operating pressure.

Once the flywheel has be running for a period of time, the pump will have removed the air from the flywheel chamber and the valve can remain open to allow the pump to maintain the reduced pressure. As described earlier, it may be desirable to close the valve even when the flywheel is not to be shut down if it has been determined that the chamber pressure has reached the optimum level, as this may reduce the power consumption by the valve solenoid, in particular, where the valve is of the normally-closed type, i.e. closed when the solenoid is not energised. The pump 30 may also be turned off to reduce power consumption. This might be achieved by using clutch or similar means to selectively connect the pump 30 to the drive shaft 24 or other drive means. Where the pump is electrically driven, turning the pump off will clearly save electrical energy.

The pressure in the chamber 23 is determined using the pressure sensor 19 in the embodiment of FIG. 2, although other methods may be used to determine the pressure. Once the machine or vehicle to which the flywheel is connected is no longer operating, it is desirable to shut down the flywheel system. Under normal operating conditions, the flywheel is allowed or caused to rotate in the near vacuum conditions. To close the system down, the valve 90 is closed to isolate the flywheel chamber from the pump 30. The flywheel can then be allowed to come to rest and the vacuum in the chamber can be largely preserved even after the flywheel (and the pump) has stopped.

In this way, when the flywheel is brought back into operation, the previous low pressure within the chamber is largely preserved and so the flywheel can operate in close to optimum vacuum conditions as soon as it starts to rotate rather than having to wait for the pump to develop the vacuum.

The arrangement of FIG. 2 may be modified to have a separate pump drive for the vacuum pump so that it is not dependent on rotation of the flywheel to operate, e.g. by providing an electric motor, flywheel transmission (which may be decoupleable from the flywheel allowing it to be rotating when the flywheel is not) or vehicle drive to drive it. With such an arrangement, the system can be operated in a slightly different way.

Initially, when the flywheel is to be brought into operation, the separate drive means is used to turn the pump 30. This begins the process of evacuating the pipes 31 connecting the flywheel chamber to the pump and the pump chamber itself. During this process the valve is initially closed. After a period of operation, the pressure at the inlet to the pump 30 will drop, ideally to below the pressure in the flywheel chamber. At this point, opening the valve 90 will allow the pump to start removing air from the chamber and reduce the pressure within to the operating pressure. This can all be done before the flywheel is caused or allowed to rotate, or with the flywheel maximum speed being restricted.

In this way, the pressure within the chamber 23 can be at or close to the operating pressure before the flywheel begins to rotate at a substantial speed, i.e. a speed at which the windage effect becomes significant. This minimises losses which may be caused by rotating the flywheel at a substantial speed in a pressure above the optimum level. This also prevents heat build-up in the flywheel due to resistance from the air, which can be especially important if the flywheel comprises composite materials such as carbon fibre reinforced plastic (CFRP).

Once the flywheel is spinning, the valve is kept open to allow the pump to maintain the pressure in the chamber. However, as indicated above, the valve may still be closed for periods of time to reduce energy consumption in the valve and pump.

When it is desired to shut down the flywheel system, again a slightly modified procedure can be used. Initially, the flywheel is rotating or being driven and the valve is open with the vacuum pump running. When it is determined to shut down the flywheel system, the first step is to close the valve to isolate the chamber from the pump. The vacuum pump can then be allowed to come to rest. At any point after the valve 90 has been closed, the flywheel may also be brought or allowed to come to rest.

In this way, the pressure is maintained in the chamber during normal operation and, by isolating the chamber, even after the valve is closed. It is preferable to keep the lubrication pump 35 operating whilst the flywheel is run down, since the lubrication pump continues to operate to maintain good oil supply to the lip seals which helps to maintain a good seal and preserve the vacuum in the chamber and also to ensure good lubrication of the various rotating elements. Only after the flywheel has come to rest is the lubrication pump shut down, as it is no longer needed.

Alternatively, when it is determined to shut down the flywheel system, the vacuum pump may be kept running, where it is powered separately from the flywheel, e.g. from an electric motor or drive train take off. The flywheel can then be brought or allowed to come to rest whilst the pressure is maintained by the pump. Once the flywheel has come to rest, the valve can be closed to preserve the vacuum in the chamber and the vacuum pump then turned off.

As noted above, the valve is preferably an electrically operated solenoid valve but may be mechanically operated. In the direct drive example above, the valve may be arranged to open only when the vacuum pump is operating at a certain speed or after a certain pressure is achieved by the vacuum pump system.

If a sufficient vacuum level has not been established within the flywheel chamber, the movement of the flywheel through the air that is present can lead to significant heat being generated. This can happen at start up when the pump has not sufficiently reduced the pressure or if the vacuum level is degraded for other reasons such as a leak. Running the flywheel in a reduced vacuum, i.e. with more that the desired amount of air in the chamber, can cause the flywheel itself to heat up which can be disadvantageous, particular where the flywheel is made using composite materials which can be heat sensitive.

To prevent or mitigate this, the pressure in the chamber can be monitored, for example by using pressure sensor 19, and if the pressure is not sufficiently low, the flywheel speed can be limited to prevent excessive build-up of heat. This limit may be staged such that the flywheel is prevented from exceeding a certain speed (or from spinning at all) above a certain pressure and then is allowed to spin up to other maximum speeds depending on the vacuum pressure level. In this way, as the pressure is progressively lowered, the maximum allowable flywheel speed is progressively increased. This may be a continuous relationship and/or set out in a series of bands with thresholds which must be exceeded to allow the maximum speed to be raised to the next level.

By limiting the flywheel speed as a function of the vacuum level, the heat build-up can be controlled to prevent the temperature of the flywheel and other components exceeding desired levels. Limiting the flywheel speed may include maintaining it stationary, which may be desirable under some conditions.

The pressure in the chamber may be determined accurately using a dedicated pressure sensor such as the sensor 19 in FIG. 2. However, as noted above, the chamber pressure may be determined in other ways. Alternatively an estimate of the pressure may be used in place of an accurate pressure measurement. The option of relying on the estimated pressure applies to determining the pressure in the chamber as well as the pressures in other parts of the system, e.g. the inlet to the vacuum pump. For example, the pump inlet pressure may be estimated from the speed of the pump (or from the speed of the flywheel in the case where the pump is coupled to the flywheel).

In the above embodiments, the valve is preferably a vacuum valve which forms a hermetic seal to prevent leakage of fluid around the valve. The valve is operated by a solenoid in the example although as noted above other valves such as a check valve or a passive or pilot operated (e.g. pressure-actuated) valve may be used, in accordance with the invention.

However, solenoid operated valves have a number of advantages. A solenoid operated valve may be actuated at will, for example according to complex logic, perhaps dependant on a number of parameters. For example, the valve may be operated prior to the vacuum pump system being brought to rest.

A check valve or similar, typically has a bias associated with it in order to achieve effective sealing. Such a bias may cause a necessary pressure differential between the chamber and the pump inlet. An externally actuated, e.g. solenoid valve, does not in itself cause such a pressure differential, so when the valve is open, the chamber may be brought down to the pressure at the inlet of the pump rather than slightly above it, due to the pressure differential.

In the embodiment above, the flywheel has a direct mechanical drive to the pump and to provide a coupling, for receiving and providing power, to a vehicle drive train, typically. However, the flywheel may be provided in a chamber that is hermetically, or near-hermetically sealed. In such cases, the flywheel may be driven by an electric motor/generator at least one part of which is mounted in the vacuum chamber, or by a magnetic coupling that communicates through a wall of the chamber housing.

As noted above, the flywheel chamber may be evacuated regularly in service, but alternatively, especially where the chamber is hermetically sealed, it may be evacuated periodically, such as only when the chamber pressure has risen above a desirable level. Thus the vacuum may be 'topped up' at longer intervals.

The vacuum pump may take a number of different forms but for this application, a vane pump is preferred. Such pumps may not bring down the chamber pressure as rapidly as, for example, some reciprocating pumps, but they may be quieter and more durable, which is desirable for vehicle applications. They are also suitable for the pumping of both oil and air, thus allowing a single device to be used rather than needing separate oil and vacuum pumps. However, a separate vacuum pump (and, if required, oil scavenging device) may be used. In the case where there is a single pump which performs both of these functions, the pump inlet is preferably below the flywheel chamber, so that oil can collect under gravity at the bottom of the chamber, so that it can then be drawn out with the air by the vacuum pump.

If, at any time, a fault is suspected in the vacuum pump system then the flywheel system may be made to shut down. For example, if the pressure at the inlet to the vacuum pump system is estimated as being substantially higher than expected, then the flywheel system may be made to shut down because it is assumed that there has been a failure of the pump system. This may include monitoring the flywheel chamber pressure to make sure that it falls, as expected, when the valve is opened. If the vacuum pump is not running or is failing to provide an adequate vacuum then when the valve is opened, the pressure would tend to rise in the chamber as opposed to falling, as expected. This unexpected behaviour would suggest that the pump is not operating correctly and the flywheel may be shut down or its speed restricted.

We claim:

1. A flywheel system comprising:
   a flywheel;
   a chamber within which said flywheel is provided;
   a passage for connecting the chamber to an inlet of a vacuum pump; and
   a valve which selectively opens or closes said passage, wherein the flywheel is mechanically coupled to the vacuum pump thereby to impart rotational drive from the flywheel to the vacuum pump.

2. A flywheel system according to claim 1, wherein the valve opens or closes said passage based at least partially upon a chamber pressure value corresponding to a pressure in the chamber.

3. A flywheel system according to claim 2, wherein the valve opens the passage when said chamber pressure value exceeds a first pressure value.

4. A flywheel system according to claim 3 wherein the first pressure value is between 4 and 8 mbar.

5. A flywheel system according to claim 4 further comprising a controller which opens the valve when said chamber pressure value corresponding to the pressure in the chamber is above said first pressure value.

6. A flywheel system according to claim 2 further comprising a pressure sensor for determining said chamber pressure value.

7. A flywheel system according to claim 1 wherein the valve includes a seal which selectively seals the passage and wherein the seal includes a face seal.

8. A flywheel system according to claim 1 further comprising a controller which maintains the valve in a closed state until the flywheel is rotating, and opens the valve after the flywheel begins rotating.

9. A flywheel system according to claim 1 further comprising a controller which starts the flywheel system by opening the valve following start-up of the flywheel system, when the vacuum pump is rotating at a speed in excess of a speed threshold value.

10. A flywheel system according to claim 1 further comprising a controller determines when rotation of the flywheel is to be shut down, and closes the valve before controlling said flywheel to come to rest.

11. A flywheel system according to claim 1 further comprising a controller which monitors a pump speed of said flywheel system, wherein the controller opens the valve when the pump speed is above a threshold value.

12. A flywheel system comprising:
    a flywheel;
    a chamber within which said flywheel is provided;
    a passage for connecting the chamber to an inlet of a vacuum pump;
    a valve arranged to selectively open or close said passage; and
    a controller which determines a chamber pressure value corresponding to a pressure in the chamber; determines a maximum allowable flywheel speed value based on the determined chamber pressure value; and controls the flywheel to limit the speed of the flywheel to be below the determined maximum allowable flywheel speed value.

13. A flywheel system according to claim 12, wherein the controller decreases the determined maximum allowable flywheel speed value with increasing pressure in the chamber.

14. A method of controlling a flywheel system according to claim 12, wherein the determined maximum allowable flywheel speed value is less than 10,000 rpm when the chamber pressure value is above 10 mbar.

15. A flywheel system comprising:
    a flywheel;
    a chamber within which said flywheel is provided;
    a passage for connecting the chamber to an inlet of a vacuum pump; and
    a valve which selectively opens or closes said passage, at least partially based upon a chamber pressure value corresponding to a pressure in the chamber, and wherein the valve opens the passage when said chamber pressure value exceeds a value that is between 4 and 8 mbar.

16. A flywheel system according to claim 15 further comprising a pressure sensor for determining said chamber pressure value.

17. A flywheel system according to claim 15 wherein the valve includes a seal for sealing the passage and wherein the seal includes a face seal.

18. A flywheel system according to claim 15 further comprising a controller which starts the flywheel system by maintaining the valve in a closed state until the vacuum pump is rotating; and opens the valve after the vacuum pump begins rotating.

19. A flywheel system according to claim 18 wherein the controller opens the valve when the vacuum pump is rotating at a speed in excess of a speed threshold value.

20. A flywheel system according to claim 15 further comprising a controller which determines when the flywheel system is to be shut down, and closes the valve before controlling the vacuum pump to come to rest.

* * * * *